United States Patent
Banno

(10) Patent No.: US 11,351,524 B2
(45) Date of Patent: Jun. 7, 2022

(54) ZEOLITE WITH RARE EARTH ELEMENT-SUBSTITUTED FRAMEWORK AND METHOD FOR PRODUCING SAME, AND NOx ADSORBER, SELECTIVE CATALYTIC REDUCTION CATALYST AND AUTOMOBILE EXHAUST GAS CATALYST COMPRISING SAME

(71) Applicant: N.E. CHEMCAT Corporation, Minato-ku (JP)

(72) Inventor: Yasuyuki Banno, Minato-ku (JP)

(73) Assignee: N.E. CHEMCAT Corporation, Minato-ku (JP)

( * ) Notice: Subject to any disclaimer, the term of this patent is extended or adjusted under 35 U.S.C. 154(b) by 0 days.

(21) Appl. No.: 16/651,099

(22) PCT Filed: Oct. 1, 2018

(86) PCT No.: PCT/JP2018/036711
§ 371 (c)(1),
(2) Date: Mar. 26, 2020

(87) PCT Pub. No.: WO2019/069859
PCT Pub. Date: Apr. 11, 2019

(65) Prior Publication Data
US 2020/0230583 A1 Jul. 23, 2020

(30) Foreign Application Priority Data
Oct. 3, 2017 (JP) .............................. JP2017-193621

(51) Int. Cl.
| | |
|---|---|
| C01B 39/06 | (2006.01) |
| B01J 29/70 | (2006.01) |
| B01D 53/94 | (2006.01) |
| B01J 35/02 | (2006.01) |
| B01J 37/00 | (2006.01) |

(Continued)

(52) U.S. Cl.
CPC ...... *B01J 29/7065* (2013.01); *B01D 53/9418* (2013.01); *B01J 29/061* (2013.01); *B01J 29/087* (2013.01); *B01J 29/088* (2013.01); *B01J 29/18* (2013.01); *B01J 29/185* (2013.01); *B01J 29/405* (2013.01); *B01J 29/505* (2013.01); *B01J 29/605* (2013.01); *B01J 29/655* (2013.01); *B01J 29/7049* (2013.01); *B01J 29/7053* (2013.01); *B01J 29/7057* (2013.01); *B01J 29/7084* (2013.01); *B01J 29/7088* (2013.01); *B01J 35/026* (2013.01); *B01J 37/0009* (2013.01); *B01J 37/0201* (2013.01); *B01J 37/088* (2013.01); *B01D 2255/2063* (2013.01); *B01D 2255/2066* (2013.01); *B01D 2255/2068* (2013.01); *B01D 2255/50* (2013.01); *B01D 2255/502* (2013.01); *B01D 2255/91* (2013.01); *B01J 2229/183* (2013.01); *B01J 2229/42* (2013.01); *F01N 2370/04* (2013.01)

(58) Field of Classification Search
CPC ........ B01J 20/18; B01J 29/70; B01J 29/7065; B01J 29/7057; B01J 29/7049; B01J 29/7053; B01J 29/7084; B01J 29/7088; B01J 29/061; B01J 29/405; B01J 29/655; B01J 29/505; B01J 29/605; B01J 29/185; B01J 29/087; B01J 29/088; B01J 2229/183; B01J 2229/42; B01J 35/026; B01J 37/088; B01J 37/0201; B01J 37/0009; C01B 39/06; F01N 2370/04; F01N 3/0842; F01N 3/2066; B01D 53/9409; B01D 53/9418; B01D 2255/50; B01D 2255/502; B01D 2255/2068; B01D 2255/2066; B01D 2255/2065; B01D 2255/2063; B01D 2255/91; Y02A 50/20; Y02T 10/12
USPC ........... 502/60, 64, 65, 71, 73; 423/700, 713
See application file for complete search history.

(56) References Cited

U.S. PATENT DOCUMENTS

| | | | | |
|---|---|---|---|---|
| 5,733,837 A | * | 3/1998 | Nakatsuji | ........... B01D 53/8628 423/239.1 |
| 5,888,921 A | * | 3/1999 | Tsang | ....................... B01J 29/84 502/64 |

(Continued)

FOREIGN PATENT DOCUMENTS

| | | |
|---|---|---|
| JP | 6-320006 A | 11/1994 |
| JP | 2012-213753 A | 11/2012 |

(Continued)

OTHER PUBLICATIONS

Chu et al. Isomorphous Substitution in Zeolite Frameworks. 1. Acidity of Surface Hydroxyls in [B]-, [Fe]-, [Ga]-, and [Al]—ZSM-5, J. Phys Chem., 89, pp. 1569-1571, 1985.*

(Continued)

*Primary Examiner* — Elizabeth D Wood
(74) *Attorney, Agent, or Firm* — Oblon, McClelland, Maier & Neustadt, L.L.P.

(57) ABSTRACT

It is intended to provide a novel zeolite with a rare earth element-substituted framework which has a higher amount of NOx adsorbed and a method for producing the same, and a NOx adsorption member and a catalyst for automobile exhaust gas, etc. comprising the same. The present invention provides a zeolite with a rare earth element-substituted framework, comprising at least a zeolite and at least one rare earth element selected from the group consisting of Ce, La, Nd and Pr, wherein a content ratio of the rare earth element is 1 to 15% by mass in total based on the total amount, and one or some of Al and/or Si atoms constituting the framework of the zeolite are replaced with the rare earth element.

18 Claims, 7 Drawing Sheets

(51) Int. Cl.
    *B01J 37/02*     (2006.01)
    *B01J 37/08*     (2006.01)
    *B01J 29/18*     (2006.01)
    *B01J 29/06*     (2006.01)
    *B01J 29/40*     (2006.01)
    *B01J 29/65*     (2006.01)
    *B01J 29/50*     (2006.01)
    *B01J 29/60*     (2006.01)
    *B01J 29/08*     (2006.01)

(56) References Cited

U.S. PATENT DOCUMENTS

| | | | | |
|---|---|---|---|---|
| 5,972,205 | A * | 10/1999 | Tsang | B01J 29/005 |
| | | | | 208/114 |
| 8,425,869 | B2 * | 4/2013 | Sato | F01N 3/0871 |
| | | | | 423/235 |
| 2006/0199725 | A1 * | 9/2006 | Du | C10G 47/16 |
| | | | | 502/73 |
| 2007/0059330 | A1 * | 3/2007 | Mukherjee | A01N 59/00 |
| | | | | 424/405 |
| 2007/0112189 | A1 * | 5/2007 | Ikeda | B01J 29/70 |
| | | | | 540/536 |
| 2008/0261802 | A1 * | 10/2008 | Du | C10G 11/05 |
| | | | | 502/65 |
| 2010/0185033 | A1 * | 7/2010 | Karim | B01J 29/46 |
| | | | | 585/408 |
| 2010/0290963 | A1 | 11/2010 | Andersen et al. | |
| 2012/0275977 | A1 * | 11/2012 | Chandler | B01J 29/0352 |
| | | | | 423/213.5 |
| 2013/0184147 | A1 * | 7/2013 | Ryoo | B01J 29/83 |
| | | | | 502/60 |

FOREIGN PATENT DOCUMENTS

| | | | |
|---|---|---|---|
| JP | 2014-18752 | A | 2/2014 |
| JP | 2015-27673 | A | 2/2015 |
| JP | 2015-151887 | A | 8/2015 |
| JP | 2015-188858 | A | 11/2015 |
| JP | 2015-196115 | A | 11/2015 |
| JP | 2016-195992 | A | 11/2016 |
| JP | 2017-101609 | A | 6/2017 |
| WO | WO 86/02020 | * | 4/1986 |
| WO | WO 2013/069713 A1 | | 5/2013 |

OTHER PUBLICATIONS

Clatworthy et al. "Emphasis on the Properties of Metal-Containing Zeolites Operating Outside the Comfort Zone of Current Heterogeneous Catalytic Reactions", Angewandte Chemie International Edition, vol. 59, Issue 44, pp. 19414-19432, 2020.*
Kosinov et al., "Engineering of Transition Metal Catalysts Confined in Zeolites", Chem. Mater. 30, 10, pp. 3177-3198, 2018.*
Thakur et al., Chem. Pap. (2017), 71:137-148.*
International Search Report dated Nov. 6, 2018 in PCT/JP2018/036711 filed on Oct. 1, 2018, 2 pages.

* cited by examiner

ZEOLITE WITH RARE EARTH ELEMENT-SUBSTITUTED FRAMEWORK AND METHOD FOR PRODUCING SAME, AND NOX ADSORBER, SELECTIVE CATALYTIC REDUCTION CATALYST AND AUTOMOBILE EXHAUST GAS CATALYST COMPRISING SAME

TECHNICAL FIELD

The present invention relates to a novel zeolite with a rare earth element-substituted framework and a method for producing the same, and a NOx adsorber, a selective catalytic reduction catalyst and an automobile exhaust gas catalyst, etc. comprising the same.

BACKGROUND ART

NOx in the atmosphere is responsible for air pollution such as photochemical smog or acid rain. Hence, NOx discharged from the emission sources of automobiles or the like equipped with internal-combustion engine, such as a gasoline engine or a diesel engine, which is one of the NOx emission sources has heretofore been a social problem. Under these circumstances, much higher performance of a NOx purification system has received attention.

For example, the selective catalytic reduction (SCR) of NOx using a nitrogen compound such as ammonia or urea is used as the NOx purification system in a wide range of fields. Thermal power plants, gas turbines, coal-fired power plants, coal-fired cogeneration plants, oil refinery heaters, chemical treatment industry, furnaces, coke ovens, municipal waste disposal equipment, incineration apparatus boilers, and the like are known as SCR purposes.

For example, a urea SCR (selective catalytic reduction) system has recently been in widespread use as a method for purifying NOx in diesel engine cars. In this urea SCR system, urea water is injected into an exhaust path, and urea is hydrolyzed at a high temperature to generate ammonia ($NH_3$) gas. This ammonia is adsorbed onto a SCR catalyst, and NOx is chemically reacted with the ammonia on the SCR catalyst and thereby purified into nitrogen and water.

Reduction treatment using a three-way catalyst cannot be performed for diesel engines in which an exhaust gas flow path becomes exceedingly oxygen-rich, direct gasoline-injection engines or lean burn engines at the time of stratified charge combustion, etc. Therefore, NOx storage reduction type catalysts or lean NOx catalysts are used for the reduction treatment of NOx in these engines. These catalysts employ a noble metal such as platinum (Pt), rhodium (Rh), or palladium (Pd) as well as a NOx trap. NOx in exhaust gas is transiently stored in the NOx trap. Then, the NOx is desorbed in a stoichiometric or rich state and reduced and purified.

Meanwhile, zeolites, one type of hydrous aluminosilicate, have a crystal structure having regular pores with a constant size and are widely used for various industrial purposes such as adsorbents or separating agents for various inorganic or organic molecules through the use of difference in polarity or molecular size as well as desiccants, dehydrating agents, ion exchangers, petroleum refinery catalysts, petrochemical catalysts, and solid acid catalysts. Also, the zeolites are widely used as catalyst supports and SCR catalysts as well as NOx traps or the like for adsorbing nitrogen oxide (NOx) such as NO or $NO_2$.

For example, Patent Literatures 1 to 6 have proposed use of a zeolite having a specific structure, or a zeolite-supported transition metal such as zeolite-supported Cu or zeolite-supported Fe, as a NOx trap or a catalyst for SCR.

CITATION LIST

Patent Literature

Patent Literature 1: WO2013/069713A1
Patent Literature 2: Japanese Patent Laid-Open No. 2015-027673
Patent Literature 3: Japanese Patent Laid-Open No. 2015-151887
Patent Literature 4: Japanese Patent Laid-Open No. 2015-196115
Patent Literature 5: Japanese Patent Laid-Open No. 2016-195992
Patent Literature 6: Japanese Patent Laid-Open No. 2015-188858

SUMMARY OF INVENTION

Technical Problem

In recent years, the further increased regulation of exhaust gas has been discussed in each country. Hence, much higher performance of a NOx purification system has received attention. Thus, zeolite-supported metals for use in catalysts for SCR, catalyst supports, NOx traps, and the like have been required to exhibit further improved performance. However, any positive report has not been found so far on novel materials that replace zeolite-supported transition metals such as zeolite-supported Cu or zeolite-supported Fe.

The present invention has been made in light of the problems described above. An object of the present invention is to provide a novel zeolite with a rare earth element-substituted framework which has a higher amount of NOx adsorbed and a method for producing the same, and a NOx adsorption member and a catalyst for automobile exhaust gas, etc. comprising the same.

Not only the object described herein but the exertion of working effects that are derived from each configuration given in "Description of Embodiments" mentioned later and cannot be obtained by conventional techniques can also be interpreted as an alternative object of the present invention.

Solution to Problem

The present inventors have conducted diligent studies to attain the object and consequently completed the present invention by finding that a zeolite with a rare earth element-substituted framework in which a predetermined rare earth element is introduced in the zeolite framework is excellent in NOx adsorption performance. Specifically, the present invention provides the following various specific aspects.

<1> A zeolite with a rare earth element-substituted framework comprising at least a zeolite and at least one rare earth element selected from the group consisting of Ce, La, Nd and Pr, wherein a content ratio of the rare earth element is 1 to 15% by mass in total based on the total amount, and one or some of Al and/or Si atoms constituting the framework of the zeolite are replaced with the rare earth element.

<2> The zeolite with a rare earth element-substituted framework according to <1>, wherein the zeolite with a rare earth element-substituted framework has a crystal structure of aluminosilicate in powder X-ray diffractometry.

<3> The zeolite with a rare earth element-substituted framework according to <1> or <2>, wherein the zeolite is at least one member selected from the group consisting of $NH_4$ type zeolite and $H^+$ type zeolite.

<4> The zeolite with a rare earth element-substituted framework according to any one of <1> to <3>, wherein the zeolite with a rare earth element-substituted framework has an average particle size $D_{50}$ of 1 μm or larger and 500 μm or smaller.

<5> A method for producing a zeolite with a rare earth element-substituted framework, comprising at least the steps of: impregnating a zeolite with an aqueous solution of a soluble salt of at least one rare earth element selected from the group consisting of Ce, La, Nd and Pr; and heat-treating the zeolite thus impregnated in a temperature range of 400° C. or higher and 650° C. or lower to obtain a zeolite with a rare earth element-substituted framework in which a content ratio of the rare earth element is 1 to 15% by mass in total based on the total amount, and one or some of Al and/or Si atoms constituting the framework of the zeolite are replaced with the rare earth element.

<6> The method for producing a zeolite with a rare earth element-substituted framework according to <5>, wherein the zeolite with a rare earth element-substituted framework has a crystal structure of aluminosilicate in powder X-ray diffractometry.

<7> The method for producing a zeolite with a rare earth element-substituted framework according to <5> or <6>, wherein the zeolite is at least one member selected from the group consisting of $NH_4$ type zeolite and $H^+$ type zeolite.

<8> The method for producing a zeolite with a rare earth element-substituted framework according to any one of <5> to <7>, wherein the zeolite with a rare earth element-substituted framework has an average particle size $D_{50}$ of 1 μm or larger and 500 μm or smaller.

<9> A selective catalytic reduction catalyst comprising at least a zeolite with a rare earth element-substituted framework according to any one of <1> to <4>.

<10> A formed article of a selective catalytic reduction catalyst prepared by forming a composition comprising a zeolite with a rare earth element-substituted framework according to any one of <1> to <4> into a predetermined shape.

<11> A NOx adsorber comprising at least a zeolite with a rare earth element-substituted framework according to any one of <1> to <4>.

<12> A NOx adsorption member prepared by forming a composition comprising a zeolite with a rare earth element-substituted framework according to any one of <1> to <4> into a predetermined shape.

<13> A laminated NOx adsorption member comprising at least a support and a NOx adsorption layer disposed on at least one side of the support, the NOx adsorption layer comprising at least a zeolite with a rare earth element-substituted framework according to any one of <1> to <4>.

<14> A catalyst for exhaust gas comprising at least a support and a catalyst layer disposed on at least one side of the support, the catalyst layer comprising at least a zeolite with a rare earth element-substituted framework according to any one of <1> to <4>.

Advantageous Effects of Invention

The present invention can provide a novel zeolite with a rare earth element-substituted framework which has a higher amount of NOx adsorbed and a method for producing the same, and a NOx adsorption member and a catalyst for automobile exhaust gas, etc. comprising the same. This NOx adsorption material, etc. has a large amount of NOx adsorbed and as such, can be preferably used as an alternative to or in combination with zeolite-supported transition metals such as zeolite-supported Cu or zeolite-supported Fe, for example, in NOx traps, SCR catalysts, urea SCR catalysts, NOx storage reduction type catalysts, and lean NOx catalysts. This achieves higher performance of a NOx purification system equipped therewith.

DESCRIPTION OF EMBODIMENTS

Figure 1:
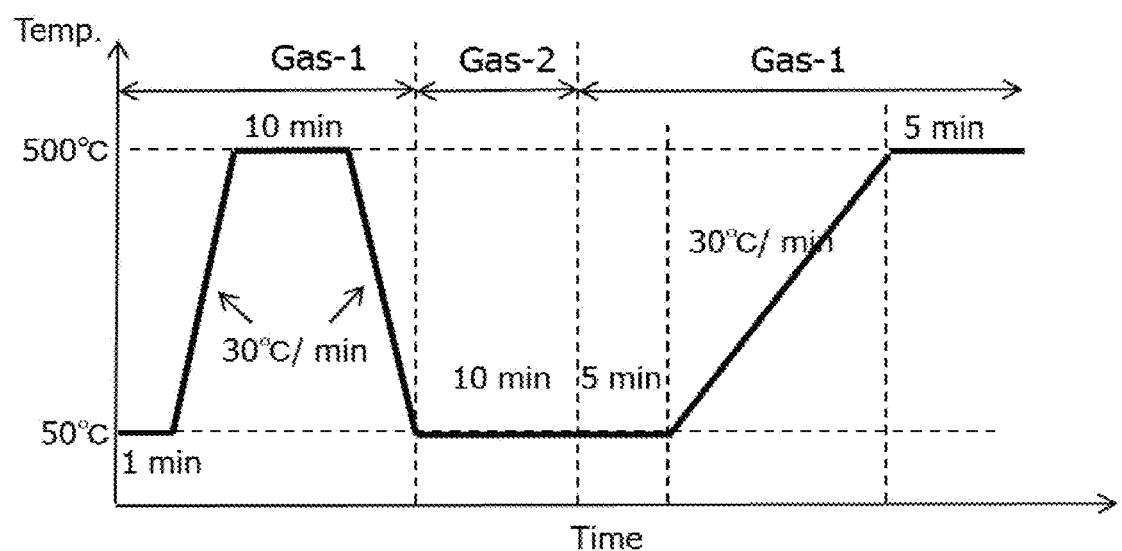
FIG. 1 is a graph showing treatment conditions in measuring the amount of NOx gas desorbed in Examples.

Hereinafter, embodiments of the present invention will be described in detail. The embodiments below are given merely for illustrating exemplary (typical) embodiments of the present invention. The present invention is not intended to be limited by them. The present invention can be carried out by arbitrarily making changes or modifications without departing from the spirit of the present invention. In the present specification, positional relationships indicated by the terms "up", "down", "right", and "left" are based on positional relationships shown in the drawings unless otherwise specified. The dimensional ratios of the drawings are not limited to ratios shown in the drawings. In the present specification, numerical values or physical property values expressed to sandwich the term "to" are used to include the values. For example, the numerical range of "1 to 100" encompasses both the upper limit value "100" and the lower limit value "1". The same holds true for the expression of other numerical ranges.

[Zeolite with Rare Earth Element-Substituted Framework and Method for Producing Same]

The zeolite with a rare earth element-substituted framework of the present embodiment comprises at least a zeolite and at least one rare earth element selected from the group consisting of Ce, La, Nd and Pr, wherein a content ratio of the rare earth element is 1 to 15% by mass based on the total amount, and one or some of Al and/or Si atoms constituting the framework of the zeolite are replaced with the rare earth element.

(Zeolite)

In the zeolite with a rare earth element-substituted framework of the present embodiment, any of various zeolites known in the art can be used for the framework substitution, and the type thereof is not particularly limited. A database of the framework structures of various zeolites is compiled by International Zeolite Association (hereinafter, also abbreviated to "IZA"). Any of zeolites having structures defined in the IUPAC structure code (hereinafter, also referred to as the "structure code") can be used without particular limitations. These structures can be identified by comparison with any of powder X-ray diffraction (hereinafter, referred to as "XRD") patterns described in Collection of simulated XRD powder patterns for zeolites, Fifth revised edition (2007) and XRD patterns described in Zeolite Framework Types of IZA Structure Commission homepage http://www.iza-structure.org/databases/.

Specific examples of the zeolite include, but are not particularly limited to, SSF type zeolite, MFI type zeolite, MEL type zeolite, MWW type zeolite, *BEA type zeolite, BEC type zeolite, BIK type zeolite, BOF type zeolite, BOG type zeolite, BRE type zeolite, CAS type zeolite, CDO type zeolite, CFI type zeolite, -CHI type zeolite, CON type zeolite, CSV type zeolite, DAC type zeolite, DDR type zeolite, DOH type zeolite, DON type zeolite, EEI type zeolite, EON type zeolite, EPI type zeolite, ESV type zeolite, EUO type zeolite, *-EWT type zeolite, FER type zeolite, GON type zeolite, HEU type zeolite, IFR type zeolite, -IFU type zeolite, IFW type zeolite, IHW type zeolite, IMF type zeolite, IRN type zeolite, IRR type zeolite, -IRY type zeolite, ISV type zeolite, ITE type zeolite, ITG type zeolite, ITH type zeolite, *-ITN type zeolite, ITR type zeolite, ITT type zeolite, ITW type zeolite, IWR type zeolite, IWS type zeolite, IWV type zeolite, IWW type zeolite, LTF type zeolite, MAZ type zeolite, MEI type zeolite, MEP type zeolite, MFS type zeolite, MON type zeolite, MOR type zeolite, *MRE type zeolite, MSE type zeolite, MTF type zeolite, MTN type zeolite, MTT type zeolite, MTW type zeolite, NES type zeolite, NON type zeolite, NSI type zeolite, OKO type zeolite, -PAR type zeolite, PCR type zeolite, POS type zeolite, RRO type zeolite, RSN type zeolite, RTE type zeolite, RTH type zeolite, RUT type zeolite, RWR type zeolite, SEW type zeolite, SFE type zeolite, SFF type zeolite, SFG type zeolite, SFH type zeolite, SFN type zeolite, SFS type zeolite, *SFV type zeolite, SGT type zeolite, SOF type zeolite, SSF type zeolite, *-SSO type zeolite, SSY type zeolite, STF type zeolite, STI type zeolite, *STO type zeolite, STT type zeolite, STW type zeolite, -SVR type zeolite, SVV type zeolite, SZR type zeolite, TER type zeolite, TON type zeolite, TUN type zeolite, UOS type zeolite, UOV type zeolite, UTL type zeolite, UWY type zeolite, VET type zeolite, VNI type zeolite, VSV type zeolite, and YUG type zeolite. These zeolites can each be used alone or can be used in an arbitrary combination of two or more thereof at an arbitrary ratio.

Among them, at least one zeolite selected from the group consisting of LTA (A type), FER (ferrierite), MWW (MCM-22), MTW (ZSM-12), MOR (mordenite), LTL (L type), FAU (Y type and X type), DDR, *BEA (beta type), AEI, AFX, LEV, KFI, MFI (ZSM-5 and silicalite), MEL (ZSM-11), and CHA (chabazite and SSZ-13) is preferred, and at least one zeolite selected from the group consisting of *BEA, AEI, AFX, LEV, KFI, MFI, MEL, and CHA is more preferred.

The zeolite is preferably Y type, beta type, mordenite type, ZSM-5 type, CHA type, ferrierite type or SAPO type, more preferably Y type, beta type, mordenite type, ZSM-5 type, CHA type or ferrierite type, further preferably Y type, ZSM-5 type, CHA type or beta type, particularly preferably Y type, CHA type or beta type, from the viewpoint of industrial easy availability.

For these zeolites, various zeolites such as Brönsted acid type having a protic hydrogen atom or Lewis acid type having a metal cation (aluminum, titanium, iron, cerium, gallium, etc.) can be used. Examples of the proton type having a protic hydrogen atom include, but are not particularly limited to, H—Y type, H-SDUSY type, H-SUSY type, H-beta type, H-mordenite type, H-ZSM-5 type, and H-ferrierite type. Examples of the ammonium type include, but are not particularly limited to, $NH_4$—Y type, $NH_4$-VUSY type, $NH_4$-beta type, $NH_4$-mordenite type, $NH_4$-ZSM-5 type, and $NH_4$-ferrierite type. In this context, proton type zeolite converted from ammonium type by calcination can also be used. Among the proton type and ammonium type zeolites, any zeolite represented by H-SDUSY type, H-SUSY type, or $NH_4$-VUSY type has a basic framework of Y type.

The silica-alumina ratio ($SiO_2/Al_2O_3$ molar ratio; hereinafter, also referred to as "SAR") of the zeolite can be appropriately set according to the type, required performance, etc. of the zeolite used. The silica-alumina ratio is not particularly limited and is generally preferably 2 or more and 1000 or less, more preferably 3 or more and 800 or less, further preferably 4 or more and 600 or less, still further preferably 5 or more and 200 or less. In the present specification, the silica-alumina ratio means a value determined by fluorescent X-ray analysis. Specifically, a sample prepared by pressure-forming approximately 5 g of a sample under 20 t was subjected to measurement using Axios (Spectris plc), and SAR was calculated from the obtained results about % by mass of $Al_2O_3$ and $SiO_2$.

In the case of using, for example, beta type zeolite, the silica-alumina ratio of the zeolite is preferably 4 or more and 600 or less, more preferably 5 or more and 200 or less, further preferably 10 or more and 100 or less, from the viewpoint of hydrothermal resistance, etc. In the case of using, for example, CHA type zeolite, the silica-alumina ratio of the zeolite is preferably 4 or more and 600 or less, more preferably 5 or more and 200 or less, further preferably 10 or more and 100 or less, from the viewpoint of hydrothermal resistance, etc.

The zeolite used herein may contain an alkali metal (M) such as Na or Ca. The alkali metal may exist in the form of an oxide or a composite oxide, or in the form of an ion at the adsorption site of the zeolite. The content of the alkali metal in the zeolite is not particularly limited. The molar ratio of the alkali metal (M) in terms of an oxide, i.e., the alkali metal oxide/silica ratio ($M_2O/SiO_2$ molar ratio), is preferably 0.01 or more and 0.50 or less, more preferably 0.05 or more and 0.30 or less.

In the case of using a zeolite in a powder form, the average particle size $D_{50}$ of the zeolite powder can be appropriately set according to the type, required performance, etc. of the zeolite used. The average particle size $D_{50}$ is not particularly limited and is preferably 1 μm or larger and 500 μm or smaller, more preferably 2 μm or larger and 350 μm or smaller, further preferably 2 μm or larger and 100 μm or smaller, from the viewpoint of a BET specific surface area, handleability, etc. In the present specification, the powder form conceptually includes a powder (powder comprising primary particles and/or aggregates of the primary particles (secondary particles)) and granules prepared by granulating the primary particles or the secondary particles. In the present specification, the average particle size $D_{50}$ means a median size measured in a laser diffraction particle size distribution measurement apparatus (e.g., manufactured by Shimadzu Corp., laser diffraction particle size distribution measurement apparatus SALD-7100). The particle shape of the zeolite is not particularly limited and may be, for example, any of spherical, ellipsoidal, crushed, flat, and amorphous shapes.

The BET specific surface area of the zeolite can be appropriately set according to the type, required performance, etc. of the zeolite used. The BET specific surface area is not particularly limited and is preferably 100 m²/g or larger and 1000 m²/g or smaller, more preferably 300 m²/g or larger and 1000 m²/g or smaller, further preferably 500 m²/g or larger and 900 m²/g or smaller.

Any of natural zeolite and synthetic zeolite may be used as the zeolite described above. The synthetic zeolite can be synthesized by a method known in the art. Typical examples of the synthesis method include a method of hydrothermally synthesizing a zeolite from a mixture (starting material composition) containing a silica source, an alumina source, an alkali metal source, optionally an organic structure directing agent, and water, etc. After the synthesis, solid-liquid separation treatment, water washing treatment, drying treatment to remove water, for example, at a temperature on the order of 50° C. to 150° C. in the atmosphere, or the like can be performed, if necessary, according to a routine method to obtain the zeolite of interest.

Examples of the silica source include, but are not particularly limited to, precipitated silica, colloidal silica, fumed silica, silica gel, sodium silicates (sodium metasilicate, sodium orthosilicate, sodium silicate No. 1, No. 2, No. 3, and No. 4, etc.), and alkoxysilanes such as tetraethoxysilane (TEOS) and trimethylethoxysilane (TMEOS). Examples of the alumina source include, but are not particularly limited to, aluminum chloride, aluminum nitrate, aluminum sulfate, and sodium aluminate. Examples of the silica source and the alumina source include, but are not particularly limited to, silicic acid alkali metal salts including sodium silicates (such as sodium silicate No. 1, No. 2, No. 3, and No. 4, sodium metasilicate, and sodium orthosilicate) and potassium silicate. Examples of the alkali metal source include, but are not particularly limited to, alkali metal hydroxides such as LiOH, NaOH, KOH, CsOH, and RbOH, aluminates of these alkali metals, and alkali components contained in the Si—Al element source and the Si element source mentioned above.

At least one member selected from the group consisting of primary amine, secondary amine, tertiary amine, and quaternary ammonium salt is used as the organic structure directing agent. Specific examples thereof include, but are not particularly limited to: hydroxide salts, halides, carbonates, sulfates, methyl carbonates and methyl sulfates containing an adamantanamine derivative such as N,N,N-trialkyladamantanammonium as a cation; and hydroxide salts, halides, carbonates, methyl carbonates and methyl sulfates containing a benzylamine derivative such as a N,N,N-trialkylbenzylammonium ion, a cyclohexylamine derivative such as a N,N,N-trialkylcyclohexylammonium ion or a N,N,N-methyldiethylcyclohexylammonium ion, a quinuclidinol derivative such as a N-alkyl-3-quinuclidinol ion, an aminonorbornane derivative such as N,N,N-trialkylexoaminonorbornane, or an alkylamine derivative having 1 to 2 carbon atoms such as a tetramethylammonium ion, an ethyltrimethylammonium ion, a diethyldimethylammonium ion, a triethylmethylammonium ion, or a tetraethylammonium ion as a cation. The organic structure directing agent is preferably at least one member selected from the group consisting of N,N,N-trimethyladamantanammonium hydroxide (hereinafter, also abbreviated to "TMAdaOH"), N,N,N-trimethyladamantanammonium halide, N,N,N-trimethyladamantanammonium carbonate, N,N,N-trimethyladamantanammonium methyl carbonate, N,N,N-trimethyladamantanammonium hydrochloride, and N,N,N-trimethyladamantanammonium sulfate. These cations may involve anions including halogen ions such as Cl$^-$, Br$^-$, and I$^-$, hydroxide ions, acetates, sulfates, and carboxylates.

The water for use in the hydrothermal synthesis can be tap water, RO water (reverse osmosis water), deionized water, distilled water, industrial water, pure water, ultrapure water, or the like according to the desired performance. As for a method for blending the water into the mixture, the water may be blended separately from each of the components mentioned above, or may be mixed in advance with these components and blended as an aqueous solution or dispersion of the components.

The mixture mentioned above may further contain seed crystals of the desired zeolite from the viewpoint of the promotion of crystallization, etc. The seed crystals blended therein tend to promote crystallization and to easily yield a high-quality zeolite. The seed crystals used herein are not particularly limited as long as the seed crystals are crystals of the desired zeolite.

The hydrothermal synthesis from the mixture mentioned above is usually performed in a reaction container. A reaction container known in the art can be appropriately used in this hydrothermal synthesis as long as the reaction container is a hermetically sealable pressure-tight container that may be used in hydrothermal synthesis. The type thereof is not particularly limited. For example, a hermetically sealable heat-resistant and pressure-tight container such as an autoclave equipped with a stirring apparatus, a heat source, a pressure gauge, and a safety valve is preferably used. The crystallization of the zeolite may be performed in a state where the mixture mentioned above is left standing. The crystallization is preferably performed in a state where the mixture mentioned above is mixed by stirring, from the viewpoint of enhancing the homogeneity of the resulting zeolite.

The treatment temperature (reaction temperature) of the hydrothermal synthesis is not particularly limited and is usually 100° C. or higher and 200° C. or lower, preferably 120° C. or higher and 190° C. or lower, more preferably 150° C. or higher and 180° C. or lower, from the viewpoint of the crystallinity of the resulting zeolite, cost efficiency, etc. The treatment time (reaction time) of the hydrothermal synthesis can be a time long enough for the crystallization and is not particularly limited. The treatment time is usually 1 hour or longer and 20 days or shorter, preferably 4 hours or longer and 10 days or shorter, more preferably 12 hours or longer and 8 days or shorter, from the viewpoint of the crystallinity of the resulting zeolite, cost efficiency, etc. The treatment pressure of the hydrothermal synthesis is not particularly limited, and a spontaneous pressure suffices which is generated by heating the mixture added into the reaction container to the temperature range described above. In this respect, an inert gas such as nitrogen or argon may be introduced, if necessary, into the container.

A large number of the zeolites mentioned above are commercially available with various grades. The grade concerned can be used from these commercially available products. Examples of the commercially available products include: Y type zeolites such as CBV760, CBV780, CBV720, CBV712 and CBV600 commercially available from Zeolyst International, Inc., and HSZ-360HOA and HSZ-320HOA commercially available from Tosoh Corp.; beta type zeolites such as CP811C, CP814N, CP7119, CP814E, CP7105, CP814C, CP811TL, CP814T, CP814Q, CP811Q, CP811E-75, CP811E and CP811C-300 commercially available from Zeolyst International, Inc., HSZ-980HOA, HSZ-940HOA and HSZ-930HOA commercially available from Tosoh Corp., and UOP-Beta commercially available from UOP LLC; mordenite type zeolites such as CBV21A and CBV90A commercially available from Zeolyst International, Inc., and HSZ-660HOA, HSZ-620HOA and HSZ-690HOA commercially available from Tosoh Corp.; ZSM-5 type zeolites such as CBV28014, CBV8014, CBV5524G and CBV8020 commercially available from Zeolyst International, Inc., and HSZ-870NHA, HSZ-860HOA and HSZ-850HOA commercially available from Tosoh Corp.; and ferrierite type zeolites such as CP914 and CP914C commercially available from Zeolyst International, Inc.

The zeolite described above may contain a structure directing agent, an alkali metal, etc. within pores or the like. Hence, these components may be removed, if necessary, by, for example, liquid phase treatment using an acidic aqueous solution, liquid phase treatment using an aqueous solution containing an ammonium ion, liquid phase treatment using a chemical solution containing a decomposition component of an organic structure directing agent, exchange treatment using a resin or the like, or calcination treatment, for example, at 400° C. or higher and 650° C. or lower.

The zeolite described above may have a metal ion such as an alkali metal ion on its ion exchange site. In this context, an ion exchange step of performing ion exchange can be performed according to the desired performance. In this ion exchange step, the metal ion can be ion-exchanged to a nonmetal cation such as an ammonium ion ($NH_4^+$) or a proton ($H^+$) according to a routine method. For example, CHA type aluminosilicate can be ion-exchanged to ammonium type by liquid phase treatment using an aqueous solution containing an ammonium ion, such as an aqueous ammonium nitrate solution or an aqueous ammonium chloride solution. Alternatively, the CHA type aluminosilicate can be ion-exchanged with ammonia and then ion-exchanged to proton type by calcination treatment. The zeolite may be further subjected, if necessary, to reduction treatment of the amount of an acid. The reduction treatment of the amount of an acid can be performed by, for example, silylation, steam treatment, or dicarboxylic acid treatment.

(Rare Earth Element)

In the zeolite with a rare earth element-substituted framework of the present embodiment, the rare earth element to be introduced into the zeolite framework (framework substitution) is at least one member selected from the group consisting of Ce, La, Nd and Pr. At least one or some of Si and/or Al atoms in the zeolite framework are replaced with the rare earth element, thereby increasing the amount of NOx adsorbed.

The state of the rare earth element existing in the zeolite with a rare earth element-substituted framework can be grasped by any of various measurement methods such as powder X-ray diffraction (XRD), nuclear magnetic resonance spectroscopy (NMR), X-ray photoelectron spectroscopy (XPS) or electron spectroscopy for chemical analysis (ESCA). In this context, in the zeolite with a rare earth element-substituted framework of the present embodiment, for example, an excess of rare earth elements may exist in an ionic state at the adsorption site of the zeolite, or some rare earth elements may be introduced in an ionic state by ion exchange with cation species in the zeolite, as long as the rare earth element mentioned above is introduced to replace at least one or more of Si and/or Al atoms (framework substitution) in the zeolite framework. Also, the rare earth element mentioned above may exist in the form of an oxide or a composite oxide. The rare earth element mentioned above in the zeolite with a rare earth element-substituted framework preferably exists as a species constituting the framework or an ion species from the viewpoint of increasing the amount of NOx adsorbed. In other words, the rare earth element mentioned above preferably exists in a non-oxide and/or non-composite oxide state. More preferably, the peak of an oxide and/or a composite oxide of the rare earth element is not observed in XRD measurement or XPS measurement.

The content ratio of the rare earth element in the zeolite with a rare earth element-substituted framework is not particularly limited and is preferably 1% by mass or more and 15% by mass or less, more preferably 1.5% by mass or more and 14% by mass or less, further preferably 3% by mass or more and 13.5% by mass or less, particularly preferably 4% by mass or more and 13% by mass or less, in total based on the total amount from the viewpoint of the amount of NOx adsorbed, cost, etc.

(Zeolite with Rare Earth Element-Substituted Framework)

The outer shape of the zeolite with a rare earth element-substituted framework of the present embodiment is not particularly limited and is preferably a powder form. In this respect, the particle shape of the zeolite with a rare earth element-substituted framework is not particularly limited and may be, for example, any of spherical, ellipsoidal, crushed, flat, and amorphous shapes. In this context, the average particle size $D_{50}$ of the zeolite with a rare earth element-substituted framework can be appropriately set according to required performance, etc. The average particle size $D_{50}$ is not particularly limited and is preferably 1 μm or larger and 500 μm or smaller, more preferably 3 μm or larger and 350 μm or smaller, further preferably 5 μm or larger and 250 μm or smaller, from the viewpoint of the amount of NOx adsorbed as well as a BET specific surface area, handleability, etc.

The zeolite with a rare earth element-substituted framework of the present embodiment preferably has a crystal structure of aluminosilicate in powder X-ray diffractometry. In this context, the phrase "having a crystal structure of aluminosilicate" means that a clear peak that exhibits a specific plane index of aluminosilicate is present in an X-ray diffraction diagram obtained by powder X-ray diffractometry. Crystalline aluminosilicate contains aluminum (Al) and silicon (Si) as main framework metal atoms and has a framework structure consisting of repeats of networks of oxygen (O) with these atoms. Therefore, the crystal structure is characterized by an X-ray diffraction diagram.

The zeolite with a rare earth element-substituted framework of the present embodiment may contain a rare earth element other than Ce, La, Nd and Pr mentioned above (hereinafter, also referred to as an "additional rare earth element"). Examples of the additional rare earth element include scandium, yttrium, promethium, samarium, europium, gadolinium, terbium, dysprosium, holmium, erbium, thulium, ytterbium, and lutetium. The content of the additional rare earth element in the zeolite with a rare earth element-substituted framework is not particularly limited and is preferably 0.001% by mass or more and 1% by mass or less, more preferably 0.005% by mass or more and 0.5% by mass or less, further preferably 0.01% by mass or more and 0.1% by mass or less, based on the total amount from the viewpoint of increasing the content ratio of Ce, La, Nd and/or Pr mentioned above.

The zeolite with a rare earth element-substituted framework may also contain a transition metal. Examples of the transition element include, but are not particularly limited to, chromium, cobalt, iron, nickel, titanium, manganese, tungsten and copper. For example, the supporting of copper or iron tends to enhance the catalyst performance of the zeolite with a rare earth element-substituted framework. The content of the transition metal in the zeolite with a rare earth element-substituted framework is not particularly limited and is preferably 0.1% by mass or more and less than 10% by mass, more preferably 0.5% by mass or more and less than 8% by mass, based on the total amount.

(Method for Producing Zeolite with Rare Earth Element-Substituted Framework)

The method for producing a zeolite with a rare earth element-substituted framework according to the present embodiment is not particularly limited as long as the zeolite with a rare earth element-substituted framework having the configuration mentioned above is obtained. For example, the zeolite mentioned above can be contacted with at least one rare earth element selected from the group consisting of Ce, La, Nd and Pr, followed by heat treatment to obtain a zeolite in which the framework is substituted by the rare earth element, i.e., a zeolite with a rare earth element-substituted framework. The rare earth element can be supplied as an inorganic acid salt of the rare earth element, for example, a sulfate, a nitrate, an acetate, a chloride, an oxide, a composite oxide, or a complex salt of the rare earth element. Specific examples of the method include, but are not particularly limited to, an ion exchange method, a method of evaporation to dryness, a precipitation supporting method, a physical mixing method, a framework substitution method and an impregnation method. Among them, an ion exchange method, a framework substitution method, an impregnation method, or the like is preferred. After transition metal supporting treatment, solid-liquid separation treatment, water washing treatment, drying treatment to remove water, for example, at a temperature on the order of 50° C. or higher and 150° C. or lower in the atmosphere, or the like can be performed, if necessary, according to a routine method. The drying treatment may be natural drying or may employ a drying apparatus such as a drum dryer, a reduced-pressure dryer, or a spray dryer. The drying treatment may be performed in the atmosphere, in vacuum, or in an inert gas (e.g., nitrogen gas) atmosphere. Before or after the drying, crushing treatment, classification treatment, or the like may be performed, if necessary.

One preferred example of the production method includes a method comprising at least the steps of: impregnating a zeolite with an aqueous solution of a soluble salt of at least one rare earth element selected from the group consisting of Ce, La, Nd and Pr; and heat-treating the zeolite thus impregnated to obtain a zeolite with a rare earth element-substituted framework. In this method, the zeolite with a rare earth element-substituted framework in which the content ratio of the rare earth element is 1 to 15% by mass in total based on the total amount can be easily obtained by adjusting the content of the rare earth element in the aqueous solution of a soluble salt. In this context, the heat treatment of the zeolite thus impregnated is preferably performed in a temperature range of 400° C. or higher and 650° C. or lower, more preferably a temperature range of 450° C. or higher and 600° C. or lower, from the viewpoint of maintaining the crystal structure of aluminosilicate, for example. The heat treatment may be performed in the atmosphere, in vacuum, or in an inert gas (e.g., nitrogen gas) atmosphere. The treatment time can be appropriately set according to the starting material used, a treatment temperature, etc. The treatment time is not particularly limited and is usually preferably 0.2 hours or longer and 48 hours or shorter, more preferably 0.5 hours or longer and 8 hours or shorter. The heat treatment can be performed using a heating unit known in the art such as an electric furnace or a gas furnace.

The transition metal or the additional rare earth element that may be contained as an optional component in the zeolite with a rare earth element-substituted framework can also be supplied as an inorganic acid salt, for example, a sulfate, a nitrate, an acetate, a chloride, an oxide, a composite oxide, or a complex salt, of the transition metal or the additional rare earth element, as in at least one rare earth element selected from the group consisting of Ce, La, Nd and Pr mentioned above. Specific examples of the method include, but are not particularly limited to, an ion exchange method, a method of evaporation to dryness, a precipitation supporting method, a physical mixing method, a framework substitution method and an impregnation method. Among them, an ion exchange method, a framework substitution method, an impregnation method, or the like is preferred. After the transition metal supporting treatment, solid-liquid separation treatment, water washing treatment, drying treatment to remove water, for example, at a temperature on the order of 50° C. or higher and 150° C. or lower in the atmosphere, or the like can be performed, if necessary, according to a routine method.

(Mode of Use)

The rare earth element oxide mentioned above; the zeolite with a zirconia- or ceria-substituted framework doped with a rare earth element and/or a transition element can be used directly as a powder and can also be used by mixing with a catalyst, a promoter or a catalyst support known in the art or with an additive known in the art. Examples of the catalyst, the promoter or the catalyst support include, but are not particularly limited to: metal oxides or metal composite oxides such as silica, alumina, ceria, zirconia, ceria-zirconia, lanthanum oxide, neodymium oxide, and praseodymium oxide; perovskite type oxide; composite oxides containing alumina, such as silica-alumina, silica-alumina-zirconia, and silica-alumina-boria; and barium compounds. Examples of the additive known in the art include, but are not particularly limited to, various binders, dispersion stabilizers such as nonionic surfactants and anionic surfactants, pH adjusters, and viscosity adjusters. The use ratio of the additive mentioned above is not particularly limited and is preferably 0.01 to 20% by mass in total, more preferably 0.05 to 10% by mass in total, further preferably 0.1 to 8% by mass in total, based on the total amount.

The zeolite with a rare earth element-substituted framework of the present embodiment may be used as a formed article by preparing a composition comprising the same and forming the composition into any predetermined shape. In this respect, a binder known in the art is preferably blended into the composition comprising the zeolite with a rare earth element-substituted framework, from the viewpoint of enhancing formability or bindability, for example. Examples of the binder include, but are not particularly limited to, various sols such as alumina sol, titania sol, silica sol, and zirconia sol. Also, a soluble salt such as aluminum nitrate, aluminum acetate, titanium nitrate, titanium acetate, zirconium nitrate, or zirconium acetate can be used as the binder. In addition, an acid such as acetic acid, nitric acid, hydrochloric acid, or sulfuric acid can also be used as the binder. The amount of the binder used is not particularly limited and can be any amount necessary for maintaining the formed article. Any of various dispersion apparatuses, kneading apparatuses, and forming apparatuses known in the art can be used in preparing the formed article. In the case of using such a formed article, the content of the zeolite with a rare earth element-substituted framework in the formed article is not particularly limited and is preferably 80% by mass or more and 99.99% by mass or less, more preferably 90% by mass or more and 99.5% by mass or less, further preferably 92% by mass or more and 99.9% by mass or less, based on the total amount.

The zeolite with a rare earth element-substituted framework of the present embodiment may be used as a noble metal supported on a zeolite with a rare earth element-substituted framework or a platinum group supported on a zeolite with a NO rare earth element-substituted framework by supporting a noble metal or a platinum group such as gold (Au), silver (Ag), platinum (Pt), palladium (Pd), rhodium (Rh), iridium (Ir), ruthenium (Ru), or osmium (Os). A method for supporting a noble metal element or a platinum group element is not particularly limited, and an approach known in the art can be applied thereto. For example, the method can be performed in the same way as the method for supplying the rare earth element mentioned above. For example, a salt solution containing a noble metal element or a platinum group element is prepared. Composite particles 31 mentioned above can be impregnated with this salt-containing solution, followed by calcination to support the noble metal or the platinum group. The salt-containing solution is not particularly limited and is preferably an aqueous nitrate solution, a dinitrodiammine nitrate solution, an aqueous chloride solution, or the like.

[Purpose]

The zeolite with a rare earth element-substituted framework of the present embodiment can be used as a NOx adsorption material or a NOx trap for adsorbing or storing NOx contained in exhaust gas in diesel engines, gasoline engines, jet engines, boilers, gas turbines, and the like. In this respect, the zeolite with a rare earth element-substituted framework of the present embodiment may be established in gas stream, or may be used as a wall material of a flow path through which gas stream passes.

The zeolite with a rare earth element-substituted framework of the present embodiment may be used as a catalyst or a catalyst support. Examples of the catalyst or catalyst support purposes include exhaust gas purification catalysts, selective catalytic reduction catalysts for NOx or the like, catalysts for lower olefin production from alcohols or ketones, cracking catalysts, dewaxing catalysts, isomerization catalysts, and catalyst supports for these catalysts. In the case of using the zeolite with a rare earth element-substituted framework of the present embodiment for the catalyst or catalyst support purposes, the transition metal mentioned above such as iron, copper or tungsten, or the noble metal or the platinum group mentioned above can be supported thereon, if necessary. The resultant can be used as, for example, an automobile exhaust gas or ethanol conversion catalyst.

[Laminated NOx Adsorption Member and Catalyst for Exhaust Gas]

The zeolite with a rare earth element-substituted framework of the present embodiment is further applicable to a NOx adsorption member having a laminated structure (laminated NOx adsorption member) comprising at least a support and a NOx adsorption layer disposed on at least one side of this support. In this case, the zeolite with a rare earth element-substituted framework of the present embodiment functions as a NOx adsorber blended into the NOx adsorption layer. The adoption of such a configuration increases applicability to various purposes, such as easy incorporation into an apparatus. The NOx adsorption layer may be allowed to function as a catalyst layer by blending any of various catalyst materials into the NOx adsorption layer.

In the present specification, the phrase "disposed on at least one side of the support" is meant to encompass a mode in which any additional layer (e.g., a primer layer and an adhesive layer) intervenes between the surface on the one side of the support and the NOx adsorption layer. Specifically, in the present specification, the phrase "disposed on one side" is used in the meaning to include both a mode in which the support and the NOx adsorption layer are in direct contact, and a mode in which the support and the NOx adsorption layer are placed with space via any additional layer. This phrase means that the NOx adsorption layer may be disposed on only one side of the support or may be disposed on a plurality of sides (e.g., one principal surface and the other principal surface).

The support used herein is not particularly limited by its type as long as the support is capable of supporting the NOx adsorption layer. Examples thereof include, but are not particularly limited to, metals, alloys, plastics, ceramic, paper, synthetic paper, nonwoven fabrics, and laminates of these materials in combination. The shape, planar shape, thickness, and the like of the support may be appropriately set according to a purpose, required performance, etc.

Use of a supporting member such as a honeycomb structure support as the support facilitates application to NOx adoption purposes for establishment in gas stream. Such a support can be appropriately selected from those known in the art. Examples of the support for automobile exhaust gas purposes include ceramic monolith supports made of cordierite, silicon carbide, silicon nitride, or the like, metal honeycomb supports made of stainless or the like, wire mesh supports made of stainless or the like, and steel wool-like knit wire supports. The shape thereof is not particularly limited and may be selected from arbitrary shapes, for example, prismatic, cylindrical, spherical, honeycomb, and sheet shapes. These supports can be used alone or in appropriate combination of two or more.

The size of the support such as a honeycomb structure support can be appropriately set according to a purpose and required performance and is not particularly limited. For example, a support having a diameter (length) of several mm or several cm can be used. In the support such as a honeycomb structure support, the number of holes as openings can be appropriately set in consideration of the type of exhaust gas to be treated, the amount of gas stream, pressure loss or removal efficiency, etc. The cell density thereof is not particularly limited and is usually preferably 100 to 900 cells/inch$^2$ (15.5 to 139.5 cells/cm$^2$), more preferably 200 to 600 cells/inch$^2$ (31 to 93 cells/cm$^2$), from the viewpoint of maintaining a high surface area against gas stream and suppressing increase in pressure loss, for example. The cell density means the number of cells per unit area at the cross section of the support such as a honeycomb structure support cut perpendicularly to a gas flow path.

A flow through type structure which communicates with a gas flow path, and a wall flow type structure in which a partial end face of a gas flow path is plugged and a gas is capable of flowing through the wall surface of the gas flow path are widely known as honeycomb structure supports for automobile exhaust gas purposes. Any of these structures are applicable to the zeolite with a rare earth element-substituted framework of the present embodiment. A flow through type structure having less resistance to air and less pressure loss of exhaust gas is preferably used.

The NOx adsorption layer is a layer containing at least the zeolite with a rare earth element-substituted framework mentioned above. The NOx adsorption layer may contain an additional component as long as the NOx adsorption layer comprises the zeolite with a rare earth element-substituted framework mentioned above. Examples of the additional component include, but are not particularly limited to: metal oxides such as zirconia; composite oxides such as zirconia doped with a rare earth element and/or a transition element; perovskite type oxide; zeolites; composite oxides containing alumina, such as silica-alumina, silica-alumina-zirconia, and silica-alumina-boria; and various binders, dispersion stabilizers such as nonionic surfactants and anionic surfactants, pH adjusters, and viscosity adjusters.

The zeolite with a rare earth element-substituted framework of the present embodiment is applicable to a catalyst member having a laminated structure (laminated catalyst member) comprising at least the support mentioned above and a catalyst layer disposed on at least one side of this support. In this case, the zeolite with a rare earth element-substituted framework of the present embodiment functions as a catalyst, a promoter and/or a NOx adsorber blended into the catalyst layer. The adoption of such a configuration increases applicability to various purposes, such as easy incorporation into an apparatus.

For example, for exhaust gas purification purposes, the zeolite with a rare earth element-substituted framework of the present embodiment can be used as a catalyst for exhaust gas having a laminated structure, i.e., an integral structure type catalyst, comprising at least the support mentioned above and a catalyst layer disposed on at least one side of this support. In this respect, exhaust gas purification can be performed with high efficiency by using the support such as a honeycomb structure support, establishing this integral structure type catalyst within a flow path through which gas stream passes, and allowing gas stream to pass through the cells of the honeycomb structure support.

For example, NOx storage reduction type catalysts, lean NOx catalysts, and SCR catalysts are known as catalysts for exhaust gas required to have NOx adsorption performance. Catalyst species, promoter species, the blending ratio of each component, catalyst laminated structures, and the like used in these catalysts can be applied to the integral structure type catalyst mentioned above. Examples of the materials for the selective catalytic reduction catalyst include various inorganic materials such as zeolite and compounds analogous to zeolite (crystalline metal aluminophosphate) as well as transition metal oxides such as vanadium oxide, titania, zirconia, and tungsten oxide, rare earth oxides such as ceria, lanthanum, praseodymium, samarium, gadolinium, and neodymium, base metal oxides such as copper oxide, iron oxide, gallium oxide, and tin oxide, and composite oxides thereof. Further examples thereof include alumina, silica, and mixtures and composites of alumina or silica modified with a rare earth, an alkali metal, an alkaline earth metal, or the like, and the oxides described above. Further examples thereof also include inorganic materials containing a base metal such as copper or iron ion-exchanged to zeolite, a compound analogous to zeolite, or the like.

The laminated NOx adsorption member or the catalyst for exhaust gas having the layer configuration mentioned above can be produced according to a routine method. For example, the surface of the support can be coated with the zeolite with a rare earth element-substituted framework mentioned above, or the zeolite with a rare earth element-substituted framework can be supported on the surface of the support to obtain a laminated NOx adsorption member or a catalyst for exhaust gas. Specifically, a method is preferably used which involves mixing the zeolite with a rare earth element-substituted framework mentioned above, an aqueous medium, and an optional binder, additional catalyst, promoter particles, OSC material, matrix particles, additive, etc. known in the art at the desired blending ratio to prepare a slurry-like mixture, and applying the obtained slurry-like mixture to the surface of the support such as a honeycomb structure support, followed by drying and calcination. In this respect, for allowing the zeolite with a rare earth element-substituted framework mentioned above to adhere or bind firmly to the support, it is preferred to use the binder or the like mentioned above.

The aqueous medium for use in preparing the slurry-like mixture can be used in an amount that permits uniform dispersion of the zeolite with a rare earth element-substituted framework in the slurry. In this respect, if necessary, an acid or a base can be blended into the mixture for pH adjustment, or a surfactant, a resin for dispersion, or the like can be blended thereinto for viscosity adjustment or improvement in slurry dispersibility. A crushing method or a mixing method known in the art, such as crushing mixing using a ball mill or the like, can be applied to a method for mixing the slurry. Various coating methods, wash coat methods, and zone coat methods known in the art can be applied to the application of the slurry-like mixture onto the support according to a routine method.

The slurry-like mixture thus applied onto the support can be dried and calcined according to a routine method to obtain the laminated NOx adsorption member or the catalyst for exhaust gas of the present embodiment. The drying temperature is, for example, preferably 70 to 200° C., more preferably 80 to 150° C. The calcination temperature is, for example, preferably 300 to 650° C., more preferably 400 to 600° C. As for a heating unit, for example, a heating unit known in the art such as an electric furnace or a gas furnace can be used.

In the laminated NOx adsorption member or the catalyst for exhaust gas mentioned above, the layer configuration of the NOx adsorption layer or the catalyst layer may be any of a single layer and multiple layers. For automobile exhaust gas purposes, the NOx adsorption layer or the catalyst layer preferably has a two-layer or more laminated structure so as to enhance NOx adsorption performance or catalyst performance, in consideration of the trends of increased regulation of exhaust gas. In this respect, the amount of the zeolite with a rare earth element-substituted framework mentioned above, used in the coating is not particularly limited and is preferably 20 to 300 g/L, more preferably 100 to 300 g/L, from the viewpoint of NOx adsorption performance or catalyst performance and the balance of pressure loss, etc.

For automobile exhaust gas purposes, the laminated NOx adsorption member or the catalyst for exhaust gas can be established in the exhaust systems of various engines. The number and position of the laminated NOx adsorption member or the catalyst for exhaust gas to be established can be appropriately designed according to the regulation of exhaust gas. For example, under strict regulation of exhaust gas, the laminated NOx adsorption member or the catalyst for exhaust gas can be established at two or more positions, which can be underfloor positions immediately below the exhaust system and in the rear of the catalyst.

EXAMPLES

Hereinafter, the features of the present invention will be described further specifically with reference to Test Examples, Examples, and Comparative Examples. However, the present invention is not intended to be limited by them by any means. Specifically, materials, amounts used, ratios, treatment contents, treatment procedures, etc. given below in Examples can be appropriately changed or modified without departing from the spirit of the present invention. Various production conditions or values of evaluation results in Examples below mean the preferred upper limit values or the preferred lower limit values in the embodiments of the present invention. Preferred ranges may be ranges defined by the combinations of the upper limit or lower limit values described above with values of Examples described below, or the combinations of the values of Examples.

Example 1

0.77 parts by mass of praseodymium(III,IV) nitrate hexahydrate (manufactured by Wako Pure Chemical Industries, Ltd., purity: 99.9%, containing 5.98% by mass of $Pr_6O_{11}$) were dissolved in 1.63 parts by mass of water to prepare a Pr-containing aqueous solution.

Next, 5 parts by mass of a $NH_4$ type beta type zeolite powder (average particle size $D_{50}$: 0.4 μm, silica-alumina ratio: 26, BET specific surface area: 667 $m^2/g$, white powder) were impregnated with the Pr-containing aqueous solution, followed by heat treatment at 550° C. for 60 minutes to obtain a zeolite powder with a Pr-substituted framework (Pr-based content ratio: 5% by mass, average particle size $D_{50}$: 24.4 μm, white powder slightly having a pale yellow green color) of Example 1.

Example 2

A zeolite powder with a Ce-substituted framework (Ce-based content ratio: 5% by mass, average particle size $D_{50}$: 17.1 μm, white powder) of Example 2 was obtained in the same way as in Example 1 except that a Ce-containing aqueous solution prepared by dissolving 0.77 parts by mass of cerium(III) nitrate hexahydrate (manufactured by Wako Pure Chemical Industries, Ltd., special grade reagent, containing 6.07% by mass of $CeO_2$) in 1.63 parts by mass of water was used instead of the Pr-containing aqueous solution.

Example 3

A zeolite powder with a La-substituted framework (La-based content ratio: 5% by mass, average particle size $D_{50}$: 18.1 μm, white powder) of Example 3 was obtained in the same way as in Example 1 except that a La-containing aqueous solution prepared by dissolving 0.78 parts by mass of lanthanum(III) nitrate hexahydrate (manufactured by Wako Pure Chemical Industries, Ltd., special grade reagent, purity: 99.9%, containing 5.81% by mass of $La_2O_3$) in 1.62 parts by mass of water was used instead of the Pr-containing aqueous solution.

Example 4

A zeolite powder with a Nd-substituted framework (Nd-based content ratio: 5% by mass, average particle size $D_{50}$: 21.8 μm, white powder slightly having a light purple color) of Example 4 was obtained in the same way as in Example 1 except that a Nd-containing aqueous solution prepared by dissolving 0.76 parts by mass of neodymium(III) nitrate hexahydrate (manufactured by Wako Pure Chemical Industries, Ltd., purity: 99.9%, containing 5.78% by mass of $Nd_2O_3$) in 1.64 parts by mass of water was used instead of the Pr-containing aqueous solution.

Comparative Example 1

5 parts by mass of the $NH_4$ type beta type zeolite powder (average particle size $D_{50}$: 0.4 μm, silica-alumina ratio: 26, BET specific surface area: 667 $m^2/g$, white powder) used in Example 1 were used as a zeolite powder of Comparative Example 1.

[Amount of NOx Gas Desorbed]

The amount of NOx gas desorbed was measured in the obtained zeolite powders with a rare earth element-substituted framework of Examples 1 to 4 and the zeolite powder of Comparative Example 1 on the basis of temperature programmed desorption (TPD) using a temperature programmed desorption test apparatus.

Here, each weighed sample powder was first loaded in a sample tube, then heated to 500° C. at a heating rate of 30° C./min in an atmosphere of model gas (Gas-1) stream shown in Table 1 for removal of adsorption species (water, gas, etc.), kept for 10 minutes as it was, and then cooled to 50° C. at a cooling rate of −30° C./min.

Next, the atmosphere was changed to model gas (Gas-2) stream shown in Table 2, and the sample was kept at 50° C. for 10 minutes.

Then, the atmosphere was changed to model gas (Gas-1) stream shown in Table 1, and the sample was kept at 50° C. for 5 minutes, then heated to 500° C. at a heating rate of 30° C./min, and kept for 5 minutes as it was. NOx gas (NO gas and $NO_2$ gas) desorbed in this operation was detected in a gas analysis apparatus. The cumulative amount of the NOx gas was calculated from the profile. The value was regarded as the amount of NOx gas desorbed (amount of NOx gas adsorbed) and evaluated.

<Measurement Conditions>

Measurement apparatus: temperature programmed desorption test apparatus (trade name: BELCAT-A-SC, manufactured by Rigaku Corp.)

Gas analysis apparatus: FT-IR gas analysis apparatus (trade name: FAST-1200, manufactured by Iwata Dengyo Co., Ltd.)

Evaluation sample: powder
Amount of sample: 50 mg
Evaluation temperature: 50 to 500° C.
Heating rate: 30° C./min
Model gas: described in Tables 1 and 2
Treatment temperature: described in FIG. 1

TABLE 1

| Gas-1 | | |
|---|---|---|
| Gas species | Gas concentration | Flow rate (cc/min) |
| $O_2$ (100%) | 20% | 60 |
| He (100%) | Balance | 240 |
| Total | | 300 |

TABLE 2

| Gas-2 | | |
|---|---|---|
| Gas species | Gas concentration | Flow rate (cc/min) |
| NO (1%) | 300 ppm | 9 |
| $O_2$ (100%) | 20% | 60 |
| He (100%) | Balance | 231 |
| Total | | 300 |

Figure 2:
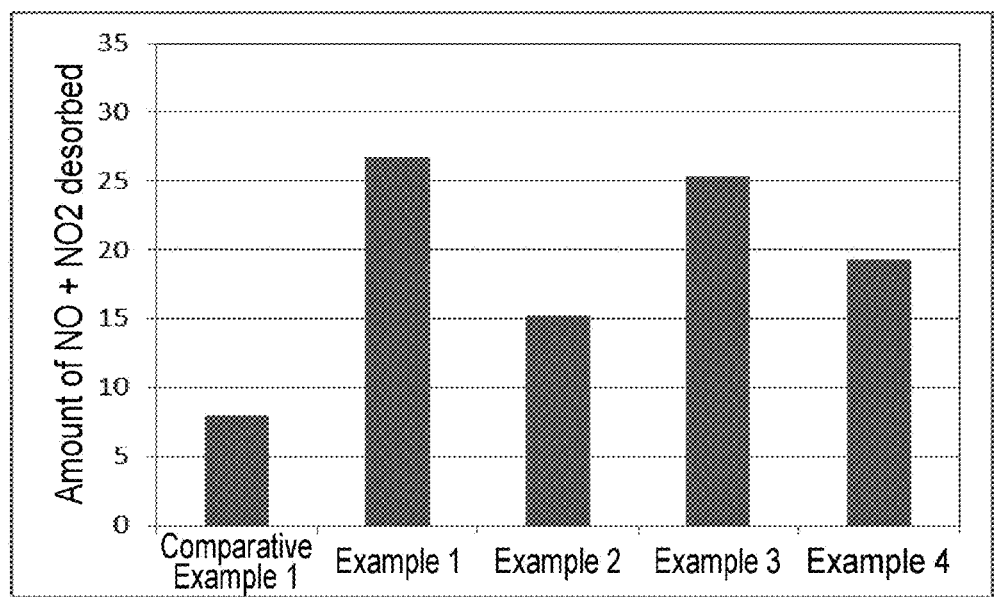
FIG. 2 is a graph showing the amount of NOx gas adsorbed in Examples 1 to 4 and Comparative Example 1.

FIG. 2 shows the amount of NOx gas desorbed (amount of NOx gas adsorbed) by the zeolite powders with a rare earth element-substituted framework of Examples 1 to 4 and the zeolite powder of Comparative Example 1. As is from these results, the amount of NOx gas adsorbed was increased by 2 to 4 times in the zeolite powders with a rare earth element-substituted framework of Examples 1 to 4 as compared with the zeolite powder of Comparative Example 1. As is also evident, in the case of beta type zeolite, the amount of NOx gas adsorbed was increased, particularly, for Pr, La, and Nd.

Example 5

A zeolite powder with a Pr-substituted framework (Pr-based content ratio: 5% by mass, average particle size $D_{50}$: 5.2 μm, white powder slightly having a pale yellow green color) of Example 5 was obtained in the same way as in Example 1 except that a $NH_4$ type CHA type zeolite powder (average particle size $D_{50}$: 1.3 μm, silica-alumina ratio: 27.9, BET specific surface area: 810 m$^2$/g) was used instead of the $NH_4$ type beta type zeolite powder.

Example 6

A zeolite powder with a Ce-substituted framework (Ce-based content ratio: 5% by mass, average particle size $D_{50}$: 3.3 μm, white powder) of Example 6 was obtained in the same way as in Example 2 except that a $NH_4$ type CHA type zeolite powder (average particle size $D_{50}$: 1.3 μm, silica-alumina ratio: 27.9, BET specific surface area: 810 m$^2$/g) was used instead of the $NH_4$ type beta type zeolite powder.

Example 7

A zeolite powder with a La-substituted framework (La-based content ratio: 5% by mass, average particle size $D_{50}$: 4.0 μm, white powder) of Example 7 was obtained in the same way as in Example 3 except that a $NH_4$ type CHA type zeolite powder (average particle size $DS_0$: 1.3 μm, silica-alumina ratio: 27.9, BET specific surface area: 810 m$^2$/g) was used instead of the $NH_4$ type beta type zeolite powder.

Example 8

A zeolite powder with a Nd-substituted framework (Nd-based content ratio: 5% by mass, average particle size $D_{50}$: 3.3 μm, white powder slightly having a light purple color) of Example 8 was obtained in the same way as in Example 4 except that a $NH_4$ type CHA type zeolite powder (average particle size $D_{50}$: 1.3 μm, silica-alumina ratio: 27.9, BET specific surface area: 810 m$^2$/g) was used instead of the $NH_4$ type beta type zeolite powder.

Comparative Example 2

5 parts by mass of the $NH_4$ type CHA type zeolite powder (average particle size $D_{50}$: 1.3 μm, silica-alumina ratio: 27.9, BET specific surface area: 810 m$^2$/g, white powder) used in Example 2 were used as a zeolite powder of Comparative Example 2.

Figure 3:
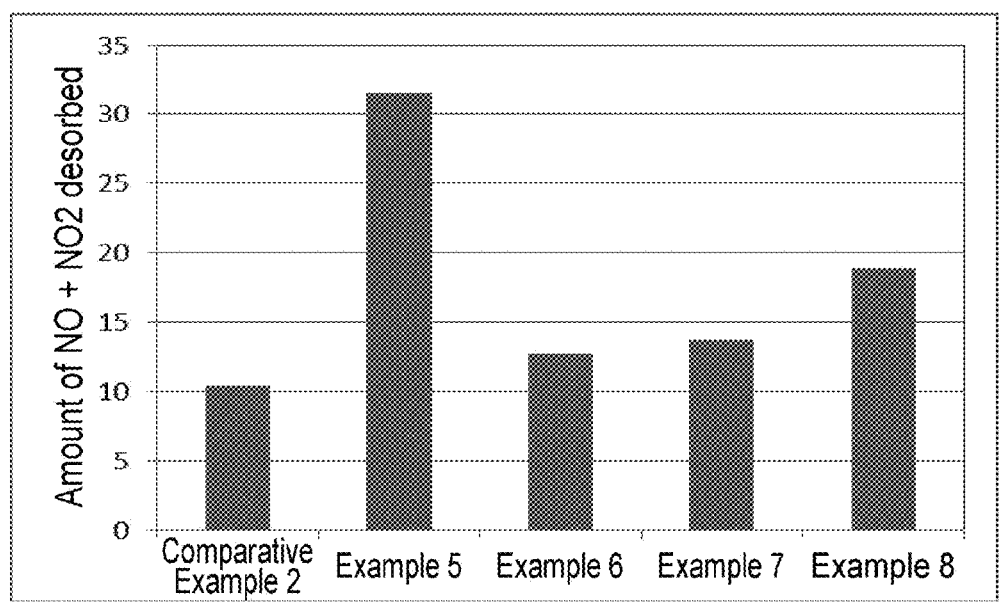
FIG. 3 is a graph showing the amount of NOx gas adsorbed in Examples 5 to 8 and Comparative Example 2.

The amount of NOx gas desorbed was measured in the obtained zeolite powders with a rare earth element-substituted framework of Examples 5 to 8 and the zeolite powder of Comparative Example 2 on the basis of temperature programmed desorption (TPD) using a temperature programmed desorption test apparatus in the same way as above. FIG. 3 shows the amount of NOx gas desorbed (amount of NOx gas adsorbed) by the zeolite powders with a rare earth element-substituted framework of Examples 5 to 8 and the zeolite powder of Comparative Example 2. As is from these results, the amount of NOx gas adsorbed was increased by 1.2 to 3 times in the zeolite powders with a rare earth element-substituted framework of Examples 5 to 8 as compared with the zeolite powder of Comparative Example 2. As is also evident, in the case of CHA type zeolite, the amount of NOx gas desorbed was large, particularly, for Pr.

Example 9

A zeolite powder with a Nd-substituted framework (Nd-based content ratio: 7% by mass, average particle size $D_{50}$: 20.8 μm, white powder slightly having a light purple color) of Example 9 was obtained in the same way as in Example 4 except that the Nd-based content ratio was changed to 7% by mass.

Figure 4:
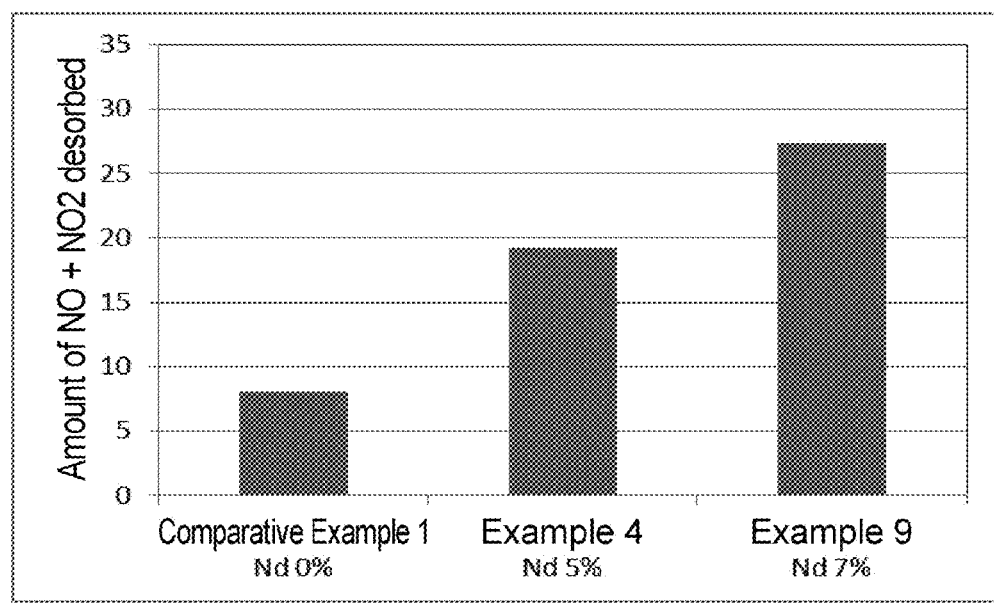
FIG. 4 is a graph showing the amount of NOx gas adsorbed in Examples 4 and 9 and Comparative Example 1.

The amount of NOx gas desorbed was measured in the obtained zeolite powders with a Nd-substituted framework of Examples 4 and 9 and the zeolite powder of Comparative Example 1 on the basis of temperature programmed desorption (TPD) using a temperature programmed desorption test apparatus in the same way as above. FIG. 4 shows the results about the amount of NOx gas adsorbed.

Example 10

A zeolite powder with a Pr-substituted framework (Pr-based content ratio: 1.8% by mass, average particle size $D_{50}$: 14.0 μm, white powder slightly having a pale yellow green color) of Example 10 was obtained in the same way as in Example 1 except that the Pr-based content ratio was changed to 1.8% by mass.

Example 11

A zeolite powder with a Pr-substituted framework (Pr-based content ratio: 6.5% by mass, average particle size $D_{50}$: 20.3 μm, white powder slightly having a pale yellow green color) of Example 11 was obtained in the same way as in Example 1 except that the Pr-based content ratio was changed to 6.5% by mass.

Example 12

A zeolite powder with a Pr-substituted framework (Pr-based content ratio: 12% by mass, average particle size $D_{50}$: 16.6 μm, white powder slightly having a pale yellow green color) of Example 12 was obtained in the same way as in Example 1 except that the Pr-based content ratio was changed to 12% by mass.

Figure 5:
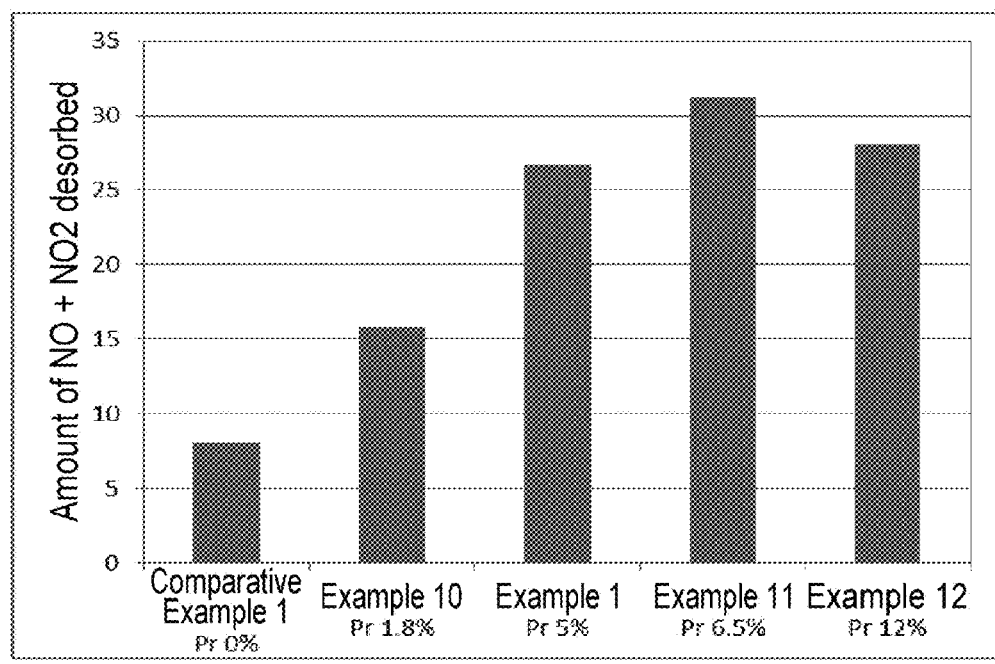
FIG. 5 is a graph showing the amount of NOx gas adsorbed in Examples 1 and 10 to 12 and Comparative Example 1.

The amount of NOx gas desorbed was measured in the obtained zeolite powders with a Nd-substituted framework of Examples 1 and 10 to 12 and the zeolite powder of Comparative Example 1 on the basis of temperature programmed desorption (TPD) using a temperature programmed desorption test apparatus in the same way as above. FIG. 5 shows the measurement results.

Example 13

A zeolite powder with a Pr-substituted framework (Pr-based content ratio: 1.8% by mass, average particle size $D_{50}$: 4.1 μm, white powder slightly having a pale yellow green color) of Example 13 was obtained in the same way as in Example 5 except that the Pr-based content ratio was changed to 1.8% by mass.

Example 14

A zeolite powder with a Pr-substituted framework (Pr-based content ratio: 6.5% by mass, average particle size $D_{50}$:

4.5 µm, white powder slightly having a pale yellow green color) of Example 14 was obtained in the same way as in Example 5 except that the Pr-based content ratio was changed to 6.5% by mass.

Example 15

A zeolite powder with a Pr-substituted framework (Pr-based content ratio: 12% by mass, average particle size $D_{50}$: 4.5 µm, white powder slightly having a pale yellow green color) of Example 15 was obtained in the same way as in Example 5 except that the Pr-based content ratio was changed to 12% by mass.

Figure 6:
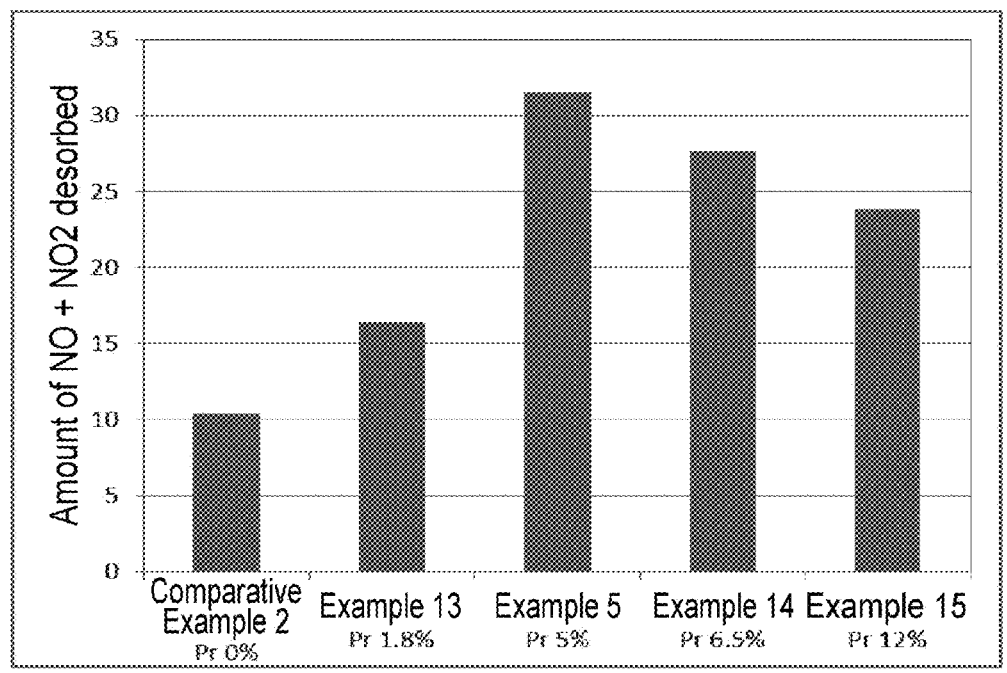
FIG. 6 is a graph showing the amount of NOx gas adsorbed in Examples 5 and 13 to 15 and Comparative Example 2.

The amount of NOx gas desorbed was measured in the obtained zeolite powders with a Pr-substituted framework of Examples 5 and 13 to 15 and the zeolite powder of Comparative Example 2 on the basis of temperature programmed desorption (TPD) using a temperature programmed desorption test apparatus in the same way as above. FIG. 6 shows the measurement results.

(Powder X-Ray Diffraction Measurement)

As a result of subjecting the zeolite powders with a Pr-substituted framework of Examples 1, 5, and 10 to 15 to powder X-ray diffraction measurement (XRD), no peak of Pr oxides ($PrO_2$, $Pr_2O_3$, $Pr_6O_{10}$, and $Pr_6O_{11}$) was detected. While the Pr oxide ($Pr_6O_{11}$ powder) was black, all the powders of Examples 1, 5, and 10 to 15 were white powders slightly having a pale yellow green color. The XRD measurement conditions are as follows.

Apparatus used: X'Pert PRO MPD (manufactured by Spectris Co., Ltd.)
X-ray source: Cu Kα
Tube voltage: 45 kV
Tube current: 40 mA
Optical system: concentration technique (XPS Measurement)

Next, as a result of performing XPS measurement, the peak of the preparation $Pr_6O_{10}$ was present at 932 eV, whereas all the peaks of Examples 1, 5, and 10 to 15 were observed at 935 eV on the high-energy side. The XPS measurement conditions are as follows.

Apparatus name: PHI Quantera SXM (manufactured by Ulvac-Phi, Inc.)
Analysis region: 200 µm (X-ray size)
Photoelectron take-off angle: 75°
Charge correction: C1s=284.8 eV
Sample pretreatment: none
Sputter: none ($^{27}$Al-NMR Measurement, and $^{29}$Si-NMR Measurement)

As a result of further performing $^{27}$Al-NMR measurement, the peak of tetracoordinated Al got smaller with increase in Pr content, and a peak appeared which seemed to be derived from amorphous Al outside the framework. As a result of performing $^{29}$Si-NMR measurement, the peak of Si was decreased with increase in Pr content, resulting in a broad peak. The $^{27}$Al-NMR and $^{29}$Si-NMR measurement conditions are as follows.

Apparatus used: Ascend 400 (manufactured by Bruker)
Measurement method: dipolar decoupling (DD/MAS)
Measurement nuclide: $^{29}$Si (Si-NMR) and $^{27}$Al (Al-NMR)
Probe: 4 mm (Si-NMR) and 2.5 mm (Al-NMR)
Rotational speed: 10 kHz (Si-NMR) and 20 kHz (Al-NMR)
The number of scans: 128 (Si-NMR) and 2048 (Al-NMR)

These results supported the presence of the rare earth element Pr in a state where the Si and/or Al atoms are replaced therewith in the zeolite framework, and suggested that some of the Pr atoms exist in an ionic state at the adsorption site of the zeolite.

Comparative Example 3

A praseodymium oxide powder (manufactured by Wako Pure Chemical Industries, Ltd., purity: 99.9%, black powder) and a $NH_4$ type beta type zeolite powder (average particle size $D_{50}$: 0.4 µm, silica-alumina ratio: 26, BET specific surface area: 667 $m^2/g$, white powder) were mixed to obtain a mixed powder (praseodymium oxide-zeolite mixed powder, Pr-based content ratio: 5% by mass, black powder) of Comparative Example 3.

Comparative Example 4

A mixed powder (praseodymium oxide-zeolite mixed powder, Pr-based content ratio: 10% by mass, black powder) of Comparative Example 4 was obtained in the same way as in Comparative Example 3 except that the mixing ratio between the praseodymium oxide powder and the beta type zeolite powder was changed.

Comparative Example 5

A praseodymium oxide powder (manufactured by Wako Pure Chemical Industries, Ltd., purity: 99.9%, black powder) and a $NH_4$ type CHA type zeolite powder (average particle size $D_{50}$: 1.3 µm, silica-alumina ratio: 27.9, BET specific surface area: 810 $m^2/g$) were mixed to obtain a mixed powder (praseodymium oxide-zeolite mixed powder, Pr-based content ratio: 5% by mass, black powder) of Comparative Example 5.

Comparative Example 6

A mixed powder (praseodymium oxide-zeolite mixed powder, Pr-based content ratio: 10% by mass, black powder) of Comparative Example 6 was obtained in the same way as in Comparative Example 5 except that the mixing ratio between the praseodymium oxide powder and the CHA type zeolite powder was changed.

Reference Example 1

For reference, a praseodymium oxide powder (manufactured by Wako Pure Chemical Industries, Ltd., purity: 99.9%, black powder) was used as it was.

Figure 7:
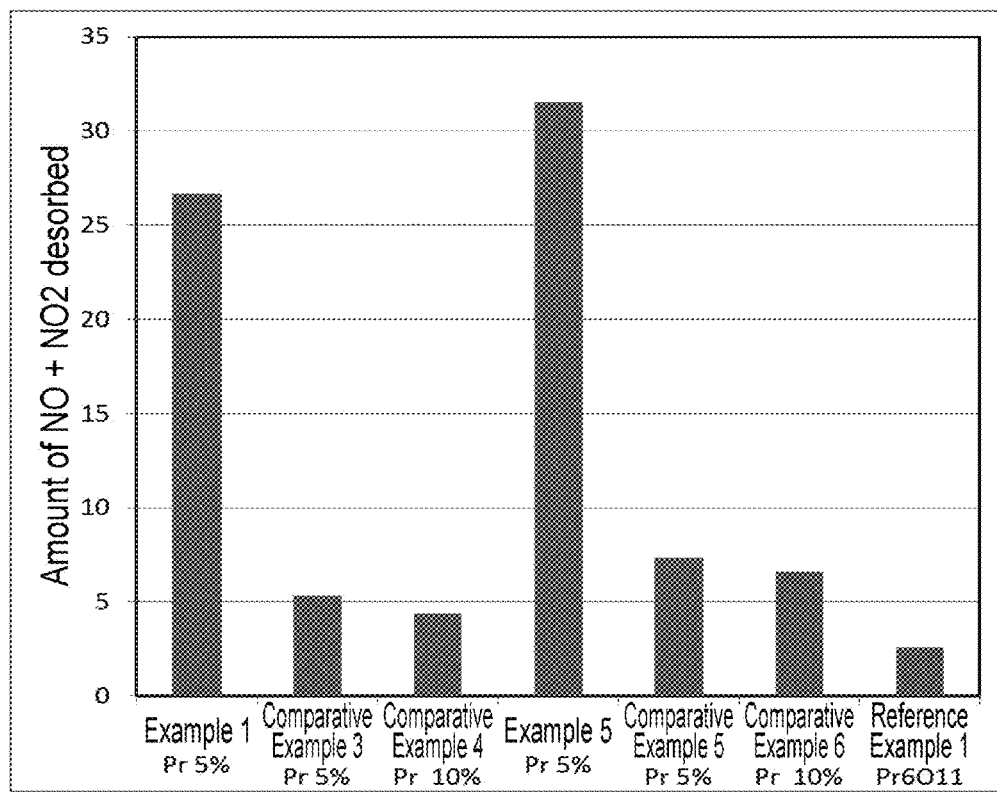
FIG. 7 is a graph showing the amount of NOx gas adsorbed in Examples 1 and 5, Comparative Examples 3 to 6, and Reference Example 1.

The amount of NOx gas desorbed was measured in the obtained zeolite powders with a Pr-substituted framework of Examples 1 and 5, the mixed powders of Comparative Examples 3 to 6, and the praseodymium oxide powder of Reference Example 1 on the basis of temperature programmed desorption (TPD) using a temperature programmed desorption test apparatus in the same way as above. FIG. 7 shows the measurement results.

INDUSTRIAL APPLICABILITY

The zeolite with a rare earth element-substituted framework of the present invention is excellent in NOx adsorption performance and as such, can be utilized widely and effectively, for example, for NOx trap, SCR catalyst, urea SCR catalyst, NOx storage reduction type catalyst, and lean NOx catalyst purposes. The NOx adsorption material of the present invention and the NOx adsorption member comprising the same can be utilized especially effectively in catalysts for automobile exhaust gas, such as NOx storage reduction type catalysts, lean NOx catalysts, and SCR catalysts, for purifying exhaust gas in diesel engines, gasoline engines, jet engines, boilers, gas turbines, and the like.

The invention claimed is:

1. A zeolite having a rare earth element-substituted framework, comprising:
   a zeolite selected from the group consisting of a CHA type and a beta type; and
   at least one rare earth element selected from the group consisting of Ce, La, Nd, and Pr,
   wherein the zeolite is an $NH_4$ ion-exchanged zeolite,
   wherein a content ratio of the rare earth element is in a range of from 1 to 15% by mass in total based on a total rare earth metal-substituted zeolite mass, and
   wherein one or some of Al and/or Si atoms constituting the framework of the zeolite are replaced with the rare earth element.

2. The zeolite of claim 1, having a crystal structure of aluminosilicate in powder X-ray diffractometry and an average particle size $D_{50}$ in a range of from 1 to 500 μm.

3. A method for producing the zeolite of claim 1 the method comprising:
   impregnating a zeolite with an aqueous solution comprising a soluble salt of at least one rare earth element selected from the group consisting of Ce, La, Nd, and Pr, to obtain an impregnated zeolite; and
   heat-treating the impregnated zeolite at a temperature in a range of from 400 to 650° C. to obtain a zeolite with the rare earth element-substituted framework in which a content ratio of the rare earth element is in a range of from 1 to 15% by mass in total based on a total rare earth metal-substituted zeolite mass, and one or some of Al and/or Si atoms constituting the framework of the zeolite are replaced with the rare earth element.

4. The method of claim 3, wherein the zeolite with a rare earth element-substituted framework has a crystal structure of aluminosilicate in powder X-ray diffractometry and has an average particle size $D_{50}$ in a range of from 1 to 500 μm.

5. A selective catalytic reduction catalyst, comprising:
   the zeolite of claim 1.

6. A formed article of a selective catalytic reduction catalyst prepared by:
   forming a composition comprising the zeolite of claim 1 into a predetermined shape.

7. An NOx adsorber, comprising:
   the zeolite of claim 1.

8. An NOx adsorption member, prepared by:
   forming a composition comprising the zeolite of claim 1 into a predetermined shape.

9. A laminated NOx adsorption member, comprising:
   a support; and
   a NOx adsorption layer disposed on at least one side of the support,
   wherein the NOx adsorption layer comprises the zeolite of claim 1.

10. A catalyst configured for exhaust gas, the catalyst comprising:
    a support; and
    a catalyst layer disposed on at least one side of the support,
    wherein the catalyst layer comprises the zeolite of claim 1.

11. The zeolite of claim 1, laving a silica-alumina ratio in a range of from 5 to 200.

12. The zeolite of claim 1, wherein the zeolite is the CHA type.

13. The zeolite of claim 1, wherein the zeolite is the beta type.

14. The zeolite of claim 1, therein the rare earth element comprises the Ce.

15. The zeolite of claim 1, wherein the rare earth element comprises the La.

16. The zeolite of claim 1, wherein the rare earth element comprises the Nd.

17. The zeolite of claim 1, wherein the rare earth element comprises the Pr.

18. The zeolite of claim 1, comprising no palladium.

* * * * *